United States Patent [19]
Sabol et al.

[11] Patent Number: 4,775,508
[45] Date of Patent: Oct. 4, 1988

[54] ZIRCONIUM ALLOY FUEL CLADDING RESISTANT TO PCI CRACK PROPAGATION

[75] Inventors: George P. Sabol, Murrysville Boro; Samuel G. McDonald III, Monroeville, both of Pa.

[73] Assignee: Westinghouse Electric Corp., Pittsburgh, Pa.

[21] Appl. No.: 132,639

[22] Filed: Dec. 8, 1987

Related U.S. Application Data

[63] Continuation of Ser. No. 057,715, Jun. 1, 1987, abandoned, which is a continuation of Ser. No. 709,852, Mar. 8, 1985, abandoned.

[51] Int. Cl.$^4$ .............................. G21C 3/20
[52] U.S. Cl. ................................ 376/416; 420/422
[58] Field of Search ............. 376/416, 417, 414, 419, 376/457; 420/422

[56] References Cited

U.S. PATENT DOCUMENTS

| | | | |
|---|---|---|---|
| 3,148,055 | 9/1964 | Kass et al. | 420/422 |
| 3,243,350 | 3/1966 | Lustman et al. | 420/422 |
| 3,271,205 | 9/1966 | Winston et al. | 420/422 |
| 3,271,265 | 9/1966 | Murray et al. | 420/422 |
| 3,620,691 | 11/1971 | Rubel | 376/416 |
| 4,212,686 | 7/1980 | Lunde et al. | 420/422 |
| 4,610,842 | 9/1986 | Vannesjo | 376/417 |
| 4,664,881 | 5/1987 | Ferrari et al. | 376/416 |
| 4,675,153 | 6/1987 | Boyle et al. | 376/416 |
| 4,735,768 | 4/1988 | Stehle et al. | 376/417 |

FOREIGN PATENT DOCUMENTS

| | | | |
|---|---|---|---|
| 1198231 | 12/1985 | Canada . | |
| 0121204 | 10/1984 | European Pat. Off. | 420/422 |
| 1589458 | 4/1970 | Fed. Rep. of Germany . | |
| 3310054 | 10/1983 | Fed. Rep. of Germany . | |
| 0058389 | 4/1984 | Japan | 376/416 |
| 0036640 | 2/1985 | Japan | 420/422 |
| 2104711 | 3/1983 | United Kingdom . | |
| 2119559 | 11/1983 | United Kingdom . | |

OTHER PUBLICATIONS

"The Development of the Zircaloys", Kass, ASTM-368, 1964, pp. 3-27.
"Zirconium and Zirconium Alloy Ingots for Nuclear Application", ASTM-B350-80, 1980.

Primary Examiner—Deborah L. Kyle
Assistant Examiner—Daniel Wasil

[57] ABSTRACT

This invention relates to a tubular water reactor fuel cladding having an outer cylindrical layer composed of a conventional zirconium base alloy. Bonded to the outer layer is a second, inner layer composed of an alloy consisting essentially of: about 0.1 to 0.3 wt. % tin; about 0.05 to 0.2 wt. % iron; about 0.05 to 0.4 wt. % niobium; about 0.03 to 0.1 wt. % of either chromium or nickel, alone or in combination with each other; while keeping the sum of the iron chromium and nickel contents below 0.25 wt. %; 300 to 1200 ppm oxygen; and the balance essentially zirconium. The inner layer is characterized by excellent resistance to PCI crack propagation, excellent aqueous corrosion resistance and a fully recrystallized microstructure.

6 Claims, 1 Drawing Sheet

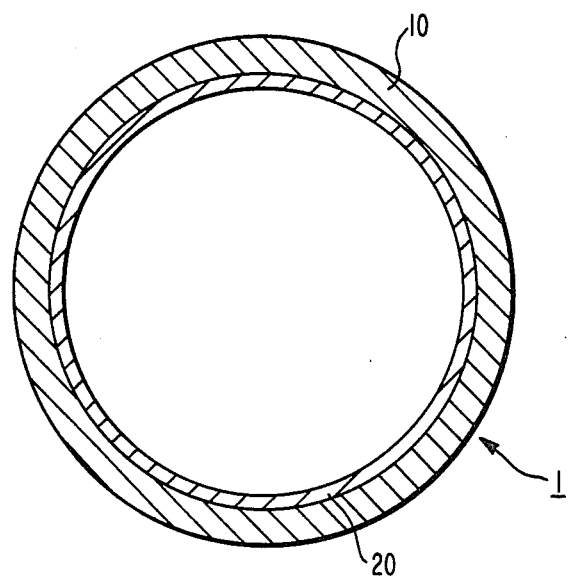

ZIRCONIUM ALLOY FUEL CLADDING RESISTANT TO PCI CRACK PROPAGATION

This application is a continuation of application Ser. No. 07/057,715 filed June 1, 1987, now abandoned, which is a continuation of application Ser. No. 709,852 filed Mar. 8, 1985, now abandoned.

BACKGROUND OF THE INVENTION

The present invention pertains to the fields of zirconium base alloy fuel cladding for use in pressurized water and boiling water reactors. It is especially concerned with fuel cladding having properties which minimize the adverse effects of pellet-clad interaction (PCI) in water reactor fuel elements.

The use of cladding tubes made entirely of a high zirconium alloy has been the practice in the water reactor industry. Examples of common alloys used are Zircaloy-2, and Zircaloy-4. These alloys were selected based on their nuclear properties, mechanical properties and high-temperature aqueous-corrosion resistance.

The history of the development of Zircaloy-2 and 4, and the abandonment of Zircaloy-1 and 3 is summarized in: Stanley Kass, "The Development of the Zircaloys," published in ASTM Special Technical Publication No. 368 (1964) pp. 3-27. This article is hereby incorporated by reference. Also of interest with respect to Zircaloy development are U.S. Pat. Nos. 2,772,964; 3,097,094; and 3,148,055.

It is understood that a popular zirconium base alloy in the USSR for use in water reactor applications has been Ozhennite-0.5. This alloy is believed to nominally contain: 0.2 wt.% Sn—0.1 wt.% Fe-0.1 wt.% Ni, and 0.1 wt.% Nb.

Most commercial chemistry specifications for Zircaloy-2 and 4 conform essentially with the requirements published in ASTM B350-80, (for alloy UNS No. R60802 and R60804, respectively) for example. In addition to these requirements the oxygen content for these alloys is required to be between 900 to 1600 ppm but typically is about 1200±200 ppm for fuel cladding applications. ASTMB350-80 is hereby incorporated by reference.

It has been a common practice to manufacture Zircaloy cladding tubes by a fabrication process involving: hot working an ingot to an intermediate size billet or log; beta solution treating the billet; machining a hollow billet; high temperature alpha extruding the hollow billet to a hollow cylindrical extrusion; and then reducing the extrusion to substantially final size cladding through a number of cold pilger reduction passes, having an alpha recrystallization anneal prior to each pass. The cold worked, substantially final size cladding is then final annealed. This final anneal may be a stress relief anneal, partial recrystallization anneal or full recrystallization anneal. The type of final anneal provided, is selected based on the designer's specification for the mechanical properties of the fuel cladding.

One problem that has occurred in the use of fuel rods utilizing the aforementioned cladding has been the observation of cracks emanating from the interior surface of the cladding which is placed under additional stress by contact with a fractured, thermally expanding oxide fuel pellet. These cracks sometimes propagate through the wall thickness of the cladding destroying the integrity of the fuel rod and thereby allowing coolant into the rod and radioactive fission products to contaminate primary coolant circulating through the reactor core. This cracking phenomena, is generally believed to be caused by the interaction of irradiation hardening, mechanical stress and fission products, producing an environment conducive to crack initiation and propagation in zirconium alloys.

Zircaloy fuel cladding tubes having a zirconium layer bonded to their inside surface have been proposed as being resistant to the propagation of cracks initiated at the interface between the fuel pellet and cladding during water reactor operation. Examples of these proposals are provided by U.S. Pat. Nos. 4,045,288; 4,372,817; 4,200,492; and 4,390,497; and U.K. patent application No. 2,104,711A. The foregoing patents are hereby incorporated by reference.

The zirconium liners of the foregoing patents have been selected because of their resistance to PCI crack propagation without consideration of this resistance to aqueous corrosion. If the cladding should breach in the reactor, allowing coolant inside the cladding, it is expected that the aqueous corrosion resistance of the liner will be vastly inferior to that of the high zirconium alloy making up the bulk of the cladding. Under these conditions the liner would be expected to completely oxidize thereby becoming useless, relatively rapidly, while leading to increased hydride formation in the zirconium alloy portion of the cladding, thereby compromising the structural integrity of the zirconium alloy. This degradation of the cladding could lead to gross failure with significantly higher release of uranium and radioactive species to the coolant.

The art has sought to address this aqueous corrosion resistance problem by burying the zirconium layer of the aforementioned patents between layers of conventional zirconium alloys having high aqueous corrosion resistance or by substituting a dilute zirconium alloy for the internally exposed zirconium layer of the prior proposals. Examples of these designs are described in U.K. patent application No. 2,119,559. Despite these efforts there continues to be a need for water reactor fuel cladding having the excellent aqueous corrosion resistance of conventional zirconium alloys on both its inside diameter and outside diameter surfaces, while having improved PCI crack propagation resistance compared to conventional Zircaloy-2 and Zircaloy-4 fuel claddings.

SUMMARY OF THE INVENTION

In accordance with the present invention a tubular fuel cladding tube is provided having excellent aqueous corrosion resistance on both its outside diameter and inside diameter surfaces as well as improved PCI crack propagation resistance compared to conventional Zircaloy-2 and 4 fuel claddings.

The fuel cladding of the present invention has an outside cylindrical layer composed of a zirconium base alloy selected from Zircaloy-2 and Zircaloy-4. Metallurgically bonded to this outer layer is an inner cylindrical layer composed of a second zirconium alloy having the composition shown below:
  about 0.1-0.3 wt.% tin;
  about 0.05-0.2 wt.% iron;
  about 0.05-0.4 wt.% niobium;
  about 0.03 to 0.1 wt.%, total, of an element selected from the group consisting of nickel, chromium and their combinations together;
  300 to 1200 ppm oxygen;
  and the balance essentially zirconium.

In the above composition the sum of the iron plus chromium plus nickel contents are held to less than 0.25 wt.%.

Preferably the oxygen content is between about 300 and 1000 ppm, and more preferably between about 300 and 700 ppm.

Also in accordance with the present invention it is preferred that the niobium content be between 0.05 to 0.2 wt.%.

These and other aspects of the present invention will become more apparent upon review of the FIGURE in conjunction with the following detailed description of the invention.

BRIEF DESCRIPTION OF THE DRAWING

The FIGURE shows a transverse cross section through an elongated fuel cladding tube in accordance with the present invention.

DETAILED DESCRIPTION OF THE INVENTION

As shown in the FIGURE, and in accordance with the present invention, a composite fuel cladding tube 1 is provided having two concentric layers, each composed of a different zirconium base alloy. The outer layer 10 is composed of a conventional high strength zirconium base alloy known for its excellent corrosion resistance in aqueous environments. This first alloy may be either Zircaloy-2 or Zircaloy-4. The Zircaloy-2 or 4 utilized preferably conforms to the chemistry specification published in ASTM B350-80 Table 1 for UNS 60802 (Zircaloy-2) or UNS 60804 (Zircaloy-4). In addition the oxygen content of these alloys should be between 900 and 1600 ppm.

Metallurgically bonded to and located within the outer layer is a second cylindrical layer 20 having the composition shown in Table I, below.

TABLE I

|  | Composition (wt. %) | Preferred Composition A (wt. %) | Preferred Composition B (wt. %) |
| --- | --- | --- | --- |
| Sn | .1–.3 | .1–.3 | .1–.3 |
| Fe | .05–.2 | .05–.2 | .05–.2 |
| Nb | .05–.4 | .05–.4 | .05–.4 |
| Ni | .03–.1 | <70 ppm | .03–.1 |
| Cr | total Ni + Cr .03–.1 | .03–.1 | <200 ppm |
| O | 300–1200 ppm | 300–700 ppm | 300–700 ppm |
| Fe + Ni + Cr | <.25 | <.25 | <.25 |
| Zr | Balance* | Balance* | Balance* |

*Zirconium is essentially the balance except for impurities (other than oxygen), which are maintained below 2000 ppm.

This inner layer has been provided to give the fuel cladding tube improved resistance to the propagation of PCI related cracks in pile. The alloy selected for this layer (as shown in Table I) contains minimal amounts of tin, iron, niobium and nickel (as noted in the table chromium may be substituted for some or all of the nickel) in order to assure that the aqueous corrosion resistance of the inner layer is at least substantially the same as the corrosion resistance of the Zircaloy outer layer. Upper limits have been provided for these elements to assure that the inner layer material maintains sufficient ductility during in pile usage to stop the propagation of PCI related cracks. At the levels shown in the table the total iron, nickel and chromium contents, as well as their individual values, have been limited to assure that the amount of precipitates formed by these elements is not excessive, thereby minimizing any adverse effects these elements may have on PCI related performance, while providing a sufficient level of precipitates to assure the desired aqueous corrosion resistance.

In one of the preferred compositions shown in Table I chromium may completely replace the nickel in the inner layer composition. For applications such as in heavy water reactors, this low nickel composition is preferred since chromium has a significantly lower thermal neutron capture cross section compared to that of nickel.

At the levels specified for tin and niobium, these elements in addition to enhancing aqueous corrosion resistance also provide some solid solution strengthening. It is critical that the niobium content be kept below 0.4 wt.% in order to minimize niobium containing precipitates. In order to provide greater assurance in this regard it is preferred that the maximum niobium content be no greater than 0.2 wt.%.

Increasing oxygen increases the hardness of the inner layer alloy and is believed to adversely affect the ability of the layer to resist PCI crack propagation in pile. Oxygen is therefore kept below 1200 ppm. Preferably the oxygen content of the inner layer is between about 300 to 1000 ppm, and more preferably between 300 and 700 ppm. The lower limit on oxygen content has been selected on the basis that any further improvement in PCI performance obtained by decreasing the oxygen further is believed to be limited and therefore cannot be justified in view of the significant additional costs involved in reducing the oxygen content further.

While it has been noted that the total impurities in the inner layer are maintained below 2000 ppm, it is preferred that it be below 1500 ppm and that individual impurity contents be within the maximum levels specified by ASTM B350-80 Table 1 UNS R60001, where applicable. ASTM B350-80, in its entirety, is hereby incorporated by reference. Electron beam melting of the zirconium starting material to be used in the inner layer alloy, may be performed to reduce total impurity content.

The thickness of the inner layer 20 is less than the thickness of the outer layer 10, and is preferably about 0.002 to about 0.006 and more preferably about 0.003 to 0.005 inches. The outer layer 20 forms the bulk of the cladding and provides the cladding with its required mechanical properties. The required thickness of this outer layer may thus be determined by conventional procedures used by those of ordinary skill in the art of nuclear fuel element design. Complete metallurgical bonding between the inner and outer layer is preferably obtained by a combination of hot working, annealing and cold working steps.

The invention will be further clarified by the following example which is intended to be purely exemplary of the present invention.

Melt an alloy having the nominal composition shown in Table II by consumable electrode vacuum arc melting the required alloying additions with commercially available zirconium. Arc melting is preferably performed at least twice.

It should be understood that the cladding chemistry requirements set forth in this application may be met by performing chemical analyses at the ingot stage of manufacture for alloying elements and impurities, and subsequently, at an intermediate stage of manufacture, such as near the co-extrustion stage, for the interstitial elements, oxygen, hydrogen and nitrogen. Chemical analysis of the final size cladding is not required.

TABLE II

| Nominal Composition of Inner Layer Material | |
| --- | --- |
| Sn | 0.2 wt. % |
| Fe | 0.1 wt. % |
| Nb | 0.1 wt. % |
| Ni | 0.05 wt. % |
| Cr | 0.05 wt. % |
| O | 300 ppm |
| Zr | remainder, with incidental impurities |

Fabricate the resulting ingot by conventional Zircaloy primary fabrication techniques, including a beta solution treatment step, into tubular starting components for the inner layer. Tubular Zircaloy starting components for the outer layer are conventionally fabricated from ingots meeting the requirements of ASTM B350-80 for grade R60802 or R60804 and having an oxygen content between about 900 and 1600 ppm. These tubular starting components, for both the inner and outer layers, may have a cold worked, hot worked, alpha annealed, or beta quenched micro-structure.

The inside diameter surface of the outer layer starting component, as well as the outside diameter surface of the inner layer starting component are then machined to size, such that the clearance between the components when nested inside of each other is minimized. After machining, the components are cleaned to remove, as nearly as possible, all surface contamination from the surfaces to be bonded. The components are then nested inside of each other, and the annulus formed at the interface of the adjacent components is vacuum electron beam welded shut, such that a vacuum is maintained in the annulus after welding both ends of the nested components.

At this stage, the unbonded tube shell assembly is ready to be processed according to the known extrusion, cold pilgering and annealing processes utilized to fabricate cladding tubes made completely of Zircaloy. Conventional Zircaloy lubricants, cleaning, straightening, and surface finishing techniques may be used in conjunction with any of the processes, both conventional and new, described in copending application Ser. Nos. 343,788 and 343,787 both filed on Jan. 29, 1982, and in U.S. Pat. No. 4,450,016 which are all hereby incorporated by reference. All of the foregoing fabrication processes will result in complete and continuous metallurgical bonding of the layers, except for minor, insignificant areas of unavoidable bond-line contamination.

Beta treatment, either by laser or induction heating, while not required to practice the present invention, is preferred. When used, such treatment would be performed either between the next to last and last cold pilgering passes preferably as a surface treatment (as described in U.S. patent application 343,788) or just prior to the next to last cold pilger pass preferably as a through wall beta treatment. After beta treatment all intermediate, as well as the final anneals, should be performed below about 600° C. and more preferably at or below about 550° C. These low temperature anneals are used to preserve the enhanced corrosion resistance imparted by the beta treatment. Most preferably, the aqueous corrosion resistance of the outer layer and inner layer are characterized by a grey or substantially black, adherent corrosion film and a weight gain of less than about 200 mg/dm$^2$, and more preferably less than about 100 mg/dm$^2$ after a 24-hour, 500° C., 1500 psi steam test.

Whether or not beta treatment has been used, the final anneal, after the final cold pilgering pass, may be one in which the zirconium alloy inner layer is stress relieved (i.e. without significant recrystallization), partially recrystallized, or fully recrystallized. Where a full recrystallization final anneal is performed, the resulting average equiaxed grain size is no larger than about ¼, and more preferably between about 1/10 and 1/30, the inner layer wall thickness and the Zircaloy outer layer has been at least fully stress relief annealed. After the final anneal, conventional Zircaloy tube cleaning, straightening, and finishing steps are performed.

The lined cladding is loaded with fissile fuel material. Preferably the fuel materials used are in the form of cylindrical pellets and may have chamferred edges and/or concavedly dished ends. Preferably those pellets are composed of $UO_2$ and are about 95% dense. The uranium in these pellets may be enriched or natural uranium. These pellets may also contain a burnable absorber such as gadolinium oxide or a boron containing compound. The resulting fuel element may be one of any of the known commercial pressurized water, boiling water, or heavy water reactor designs, preferably containing helium within the sealed fuel rod.

Other embodiments of the present invention will be apparent to those skilled in the art from a consideration of this specification or practice of the invention disclosed herein. It is intended that the specification and examples be considered as illustrative only, with the true scope and spirit of the invention being indicated by the following claims.

We claim:
1. A corrosion and crack resistant water reactor fuel cladding tube comprising:
   an outer cylindrical layer of a first zirconium alloy selected from the group consisting of Zircaloy-2 and Zircaloy-4;
   an inner cylindrical layer of a second zirconium alloy consisting essentially of:
      about 0.1–0.3 wt.% tin,
      about 0.05 to 0.2 wt.% iron,
      about 0.05 to 0.4 wt.% niobium,
      about 0.03 to 0.1 wt.% of an element selected from the group consisting of nickel, chromium and their combinations together, wherein the sum of the iron plus nickel plus chromium contents is less than 0.25 wt.%;
   less than 2000 ppm total impurities;
   300–700 ppm oxygen;
   and zirconium forming essentially the balance;
   said inner cylindrical layer metallurgically bonded to said outer layer;
   and whereby said inner cylindrical layer has an aqueous corrosion resistance which is at least substantially equivalent to the corrosion resistance of said outer cylindrical layer.

2. The water reactor fuel cladding tube according to claim 1 wherein said second zirconium alloy has nickel content of 0.03–0.1 wt.% and a chromium content of less than 200 ppm.

3. The water reactor fuel cladding tube according to claim 1 wherein said second zirconium alloy has a chromium content of 0.03 to –0.1 wt.%, and a nickel content of less than 70 ppm.

4. The water reactor fuel cladding tube according to claim 1 wherein said second zironium alloy has a niobium content of 0.05 to 0.2 wt.%.

5. The water reactor fuel cladding tube according to claim 1 having a weight gain of less than 200 mg/dm² and an essentially black, adherent oxide film on said inner and said outer layers after 24 hours exposure to a 500° C. 1500 psi steam test.

6. The water reactor fuel cladding tube according to claim 1 wherein said inner cylindrical layer has a fully recrystallized microstructure.

* * * * *